United States Patent
Mizutani et al.

(10) Patent No.: US 11,493,862 B2
(45) Date of Patent: Nov. 8, 2022

(54) TONER CONVEYANCE DEVICE INCLUDING CONVEYANCE SCREW AND IMAGE FORMING APPARATUS

(71) Applicant: KYOCERA Document Solutions Inc., Osaka (JP)

(72) Inventors: Naoki Mizutani, Osaka (JP); Koshiro Tomimori, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/429,261

(22) PCT Filed: Jan. 22, 2020

(86) PCT No.: PCT/JP2020/002133
§ 371 (c)(1),
(2) Date: Aug. 6, 2021

(87) PCT Pub. No.: WO2020/162178
PCT Pub. Date: Aug. 13, 2020

(65) Prior Publication Data
US 2022/0011694 A1 Jan. 13, 2022

(30) Foreign Application Priority Data
Feb. 7, 2019 (JP) .............................. JP2019-020285

(51) Int. Cl.
*G03G 15/08* (2006.01)
*B65G 33/22* (2006.01)
*G03G 21/10* (2006.01)

(52) U.S. Cl.
CPC ......... *G03G 15/0891* (2013.01); *B65G 33/22* (2013.01); *G03G 15/0898* (2013.01); *G03G 21/105* (2013.01); *G03G 2215/0827* (2013.01); *G03G 2215/0838* (2013.01)

(58) Field of Classification Search
CPC ............ G03G 15/0891; G03G 21/105; G03G 15/0893; G03G 15/0894; G03G 2215/0827; G03G 2215/0838; G03G 15/0898; G03G 15/0935; B65G 33/22
See application file for complete search history.

(56) References Cited

U.S. PATENT DOCUMENTS

| 10,175,611 B2 | 1/2019 | Nemoto |
| 2018/0275562 A1 | 9/2018 | Nemoto |

FOREIGN PATENT DOCUMENTS

| JP | 2009-053577 A | 3/2009 |
| JP | 2015-215474 A | 12/2015 |
| JP | 2018-159874 A | 10/2018 |

*Primary Examiner* — Walter L Lindsay, Jr.
*Assistant Examiner* — Laura Roth
(74) *Attorney, Agent, or Firm* — Studebaker & Brackett PC

(57) ABSTRACT

An image forming apparatus (1) includes a casing (21) having a toner conveyance path (34); a screw (24) conveying a toner in the toner conveyance path (34) in a predetermined conveyance direction; and a downstream side bearing (25) rotatably supporting a downstream side end portion of the screw (24) in the conveyance direction, wherein the screw (24) includes: a shaft (51) extending in the conveyance direction; and a spiral fin (52) provided around an outer circumferential face of the shaft (51), the shaft (51) has a downstream side insertion part (54) inserted into the downstream side bearing (25), and the downstream side insertion part (54) has an outer diameter larger than an outer diameter of a downstream side end portion of the fin (52) in the conveyance direction.

8 Claims, 6 Drawing Sheets

TONER CONVEYANCE DEVICE INCLUDING CONVEYANCE SCREW AND IMAGE FORMING APPARATUS

TECHNICAL FIELD

The present invention relates to a toner conveyance device and an image forming apparatus.

BACKGROUND

An electrophotographic type image forming apparatus includes a toner conveyance device which conveys a toner to be supplied to an image carrier (such as a photosensitive drum and an intermediate transferring belt) or conveys a waste toner collected from the image carrier.

For example, a toner conveyance device may include a casing having a toner conveyance path, a screw conveying a toner in the toner conveyance path and bearings to which both end portions of the screw are rotatably supported (see Patent Document 1).

PRIOR ART DOCUMENT

Patent Document

[Patent Document 1] Japanese Patent laid-open Publication No. 2018-159874

SUMMARY OF INVENTION

Problems to be Solved by the Invention

In the above toner conveyance device, in order to smoothly rotate the screw with respect to the bearings, it is preferable to provide a slight gap between both end portions of the screw and the bearings. However, if the gap is provided between both end portions of the screw and the bearings in the above manner, there is a possibility that the toner leaks to the outside of the toner conveyance device through the gap.

In particular, when the toner is conveyed in a predetermined conveyance direction by the screw, the toner is pressed with a large force to the gap between the bearing and the downstream side end portion of the screw in the conveyance direction. Accordingly, the toner easily leaks to the outside of the toner conveyance device through the gap.

In order to suppress such toner leakage to the outside of the toner conveyance device, a sealing member may be provided on the outside of the bearing. However, if such a configuration is adopted, the configuration of the toner conveyance device becomes complicated as the number of members increases, and the manufacturing cost of the toner conveying device may increase.

Therefore, it is an object of the present invention to suppress toner leakage to the outside of the toner conveyance device by using a simple configuration.

Means of Solving the Problems

A toner conveyance device in the present invention includes: a casing having a toner conveyance path; a screw conveying a toner in the toner conveyance path in a predetermined conveyance direction; and a downstream side bearing rotatably supporting a downstream side end portion of the screw in the conveyance direction, wherein the screw includes: a shaft extending in the conveyance direction; and a spiral fin provided around an outer circumferential face of the shaft, the shaft has a downstream side insertion part inserted into the downstream side bearing, and the downstream side insertion part has an outer diameter larger than an outer diameter of a downstream side end portion of the fin in the conveyance direction.

An image forming apparatus in the present invention includes the toner conveyance device.

Effect of the Invention

According to the present invention, it becomes possible to suppress toner leakage to the outside of the toner conveyance device using a simple structure.

THE MODE FOR CARRYING OUT THE INVENTION

Hereinafter, an image forming apparatus 1 according to one embodiment of the present invention will be described with reference to the drawings. Arrows Fr, Rr, L, R, U and Lo marked in each drawing show the front side, the rear side, the left side, the right side, the upper side and the lower side of the image forming apparatus 1, respectively.

First, an entire structure of the image forming apparatus 1 will be described. The image forming apparatus 1 is a multifunctional peripheral having a printing function, a copying function and a facsimile function totally.

Figure 1:
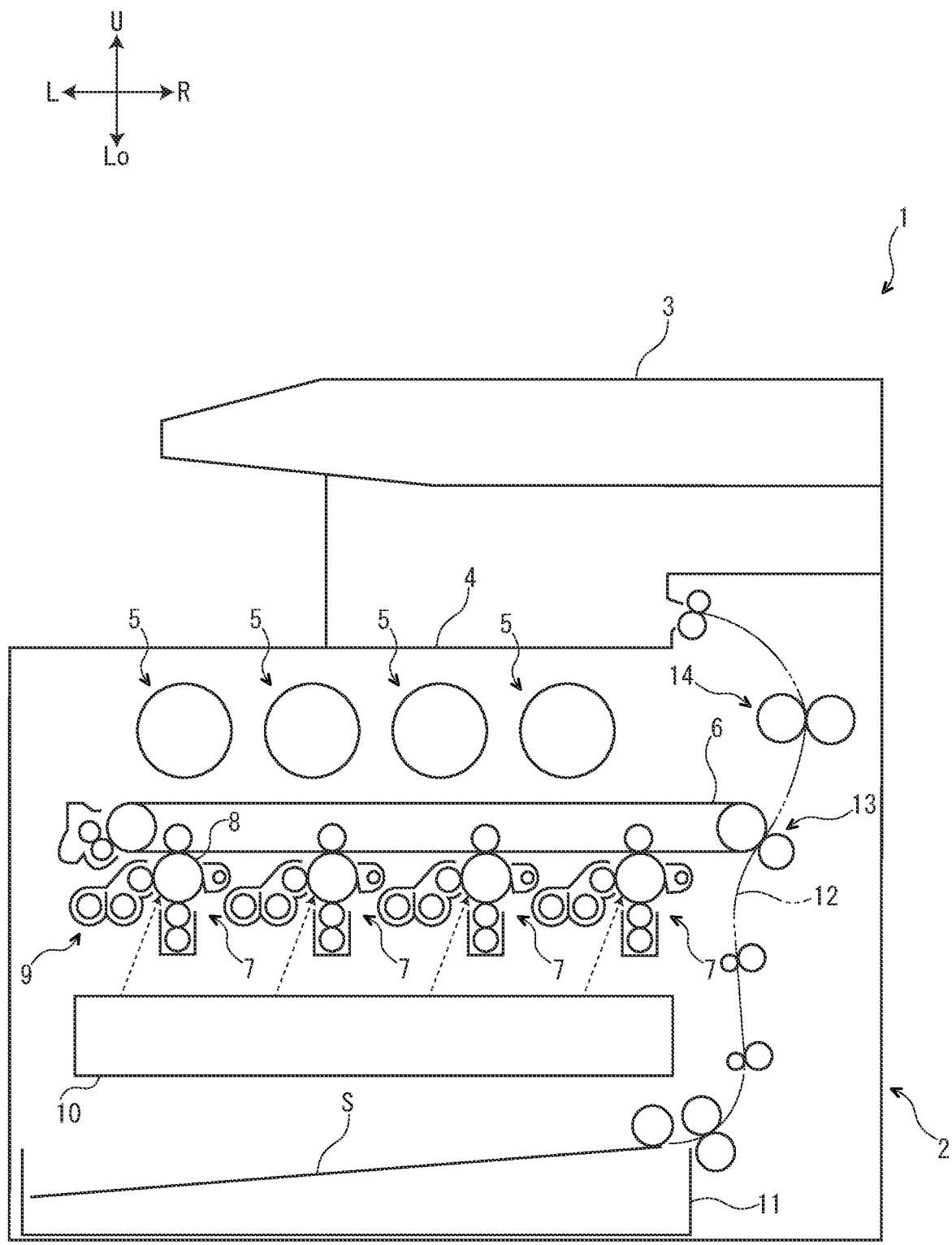
FIG. 1 is a front view schematically showing an image forming apparatus according to one embodiment of the present invention.

With reference to FIG. 1, the image forming apparatus 1 includes a box-shaped apparatus main body 2. On the upper end portion of the apparatus main body 2, an image reading device 3 for reading a document image is provided.

In the upper portion of the apparatus main body 2, a discharge tray 4 is provided. In the upper portion of the apparatus main body 2, four toner containers 5 are stored below the discharge tray 4.

In the center portion of the apparatus main body 2, an intermediate transferring belt 6 and four image forming parts 7 are stored. Each image forming part 7 includes a photosensitive drum 8 and a development device 9 (an example of a toner conveyance device). In the lower portion of the apparatus main body 2, an exposure device 10 is stored. In the lower end portion of the apparatus main body 2, a sheet feeding cassette 11 in which a sheet S (an example of a recording medium) is stored is stored.

In the right side portion of the apparatus main body 2, a sheet conveyance path 12 is provided. On the midstream portion of the sheet conveyance path 12, a secondary transferring part 13 is provided. On the downstream portion of the sheet conveyance path 12, a fixing device 14 is provided.

Next, an example of an operation of the image forming apparatus 1 will be described.

First, an electrostatic latent image is formed on the photosensitive drum 8 of each image forming part 7 by light (refer to a dotted line arrow in FIG. 1) emitted from the exposure device 10. The development device 9 of each image forming part 7 develops the electrostatic latent image. Then, a toner image is carried on the photosensitive drum 8 of each image forming part 7. The toner image is primarily transferred from the photosensitive drum 8 of each image forming part 7 to the intermediate transferring belt 6. Thus, the toner image is formed on the intermediate transferring belt 6.

On the other hand, the sheet S fed from the sheet feeding cassette 11 is conveyed to the downstream side along the sheet conveyance path 12, and enters the secondary transferring part 13. At the secondary transferring part 13, the toner image is secondary transferred from the intermediate transferring belt 6 to the sheet S. The sheet S on which the toner image is secondarily transferred is conveyed to the downstream side along the sheet conveyance path 12, and then enters the fixing device 14. The fixing device 14 fixes the toner image on the sheet S. The sheet S on which the toner image is fixed is discharged on the discharge tray 4.

Next, the development device 9 will be described in detail.

It should be noted that an arrow C1 appropriately marked in each drawing indicates a first conveyance direction (hereinafter, referred to as "a first conveyance direction C1") of the toner in the development device 9. The first conveyance direction C1 is a direction from the front side to the rear side along the front-and-rear direction. An arrow C2 appropriately marked in each drawing indicates a second conveyance direction (hereinafter, referred to as "a second conveyance direction C2") of the toner in the development device 9. The second conveyance direction C2 is a direction from the rear side to the front side along the front-and-rear direction, and is a direction opposite to the first conveyance direction C1.

Figure 2:
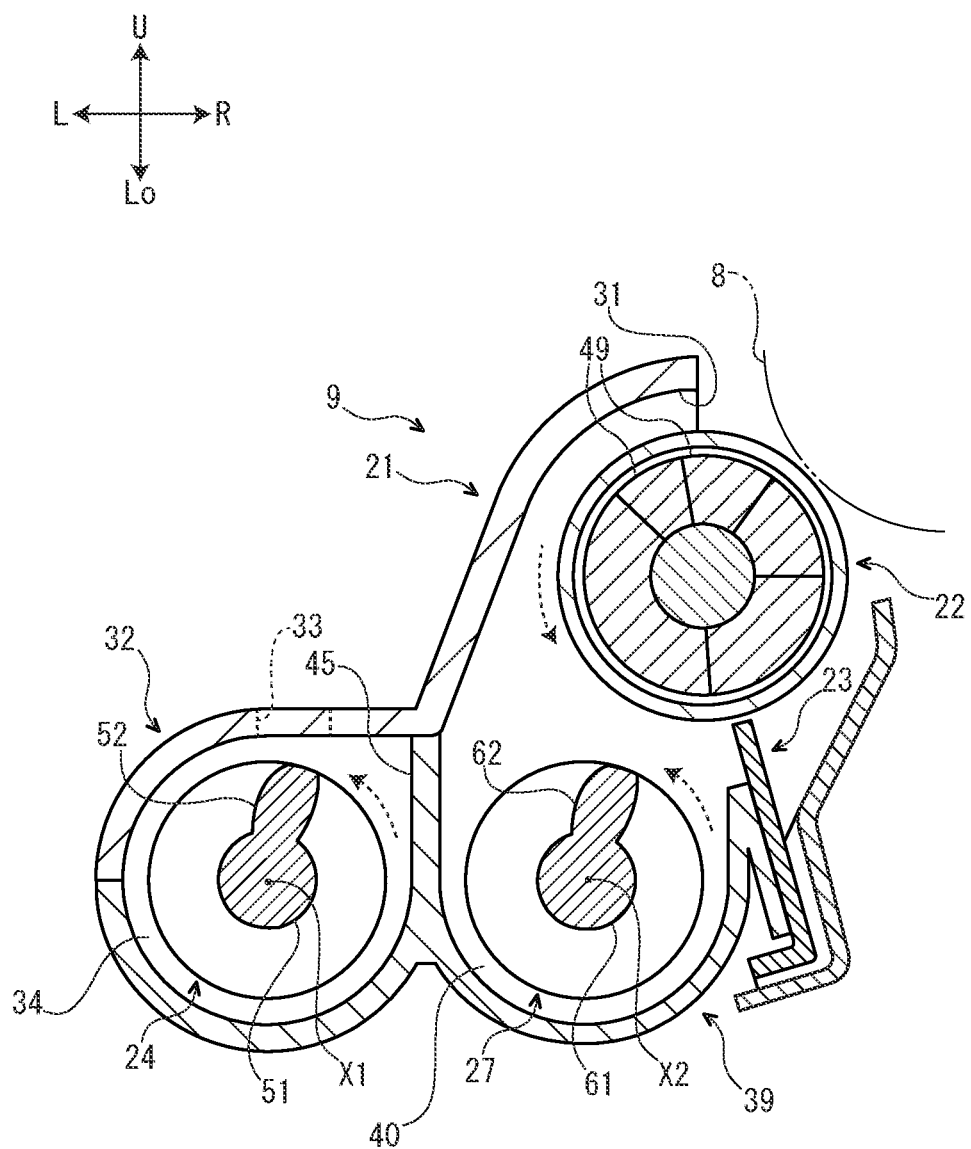
FIG. 2 is a sectional view showing a development device, viewed from the front side, according to the embodiment of the present invention.
Figure 3:
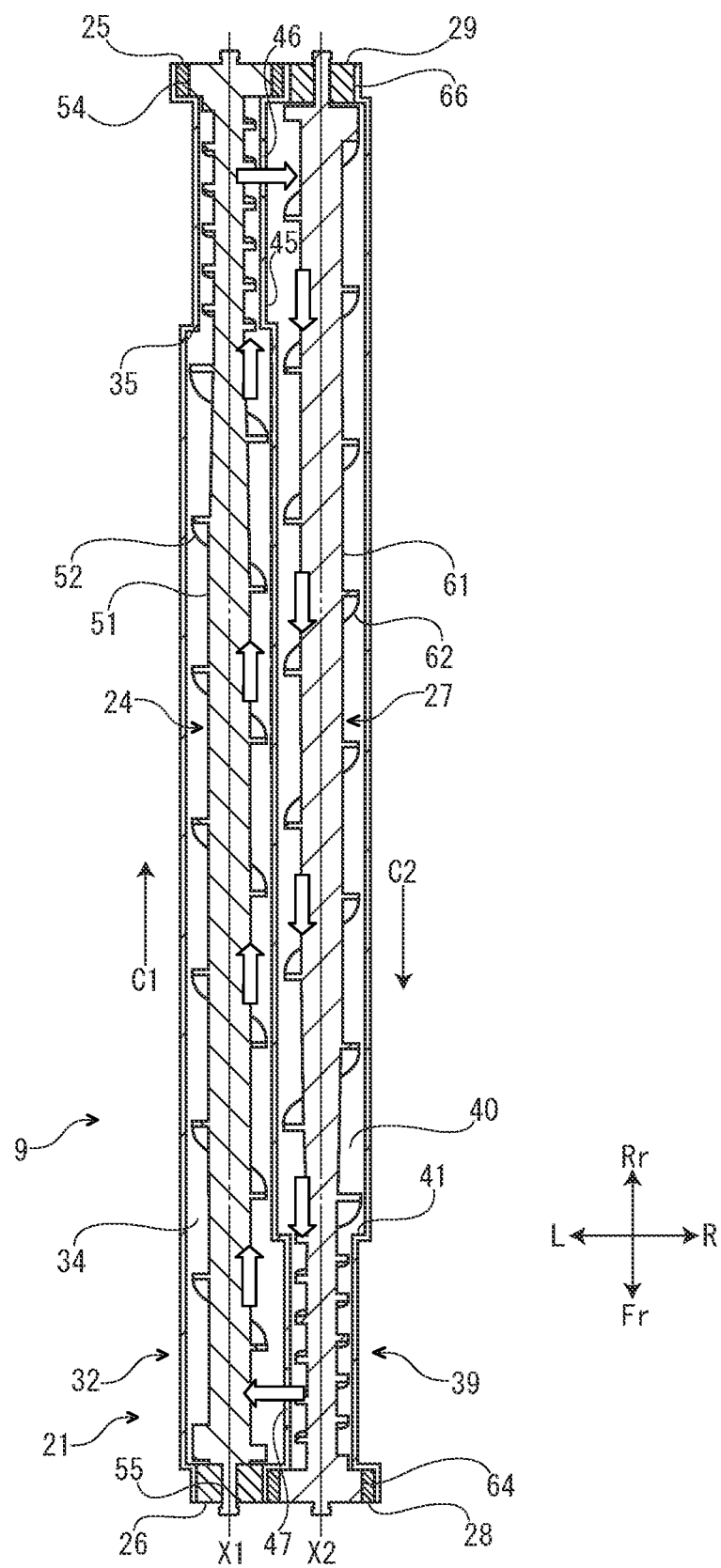
FIG. 3 is a sectional view showing the development device, viewed from the upper side, according to the embodiment of the present invention.

With reference to FIG. 2 and FIG. 3, the development device 9 includes a casing 21, a development roller 22 stored in the right upper portion of the casing 21, a regulating blade 23 provided below the development roller 22, a first screw 24 stored in the left lower portion of the casing 21, a first downstream side bearing 25 for rotatably supporting the rear end portion (the downstream end portion in the first conveyance direction C1) of the first screw 24, a first upstream side bearing 26 for rotatably supporting the front end portion (the upstream end portion in the first conveyance direction C1) of the first screw 24, a second screw 27 stored in the right lower portion of the casing 21, a second downstream side bearing 28 for rotatably supporting the front end portion (the downstream end portion in the second conveyance direction C2) of the second screw 27, and a second upstream side bearing 29 for rotatably supporting the rear end portion (the upstream end portion in the second conveyance direction C2) of the second screw 27. Hereinafter, each component 21 to 29 of the development device 9 will be described in order.

With reference to FIG. 2 and FIG. 3, the casing 21 of the development device 9 has a long shape in the front-and-rear direction. That is, in this embodiment, the front-and-rear direction is the longitudinal direction of the casing 21, and the left-and-right direction is the width direction of the casing 21. In the right upper portion of the casing 21, an opening 31 is provided.

In the left lower portion of the casing 21, a cylindrical first duct 32 is provided. The first duct 32 extends along the first conveyance direction C1. On the upper face of the first duct 32, a toner replenishment port 33 for replenishing a toner to the inner space of the casing 21 is provided. In the first duct 32, a first toner conveyance path 34 is provided.

Figure 4:
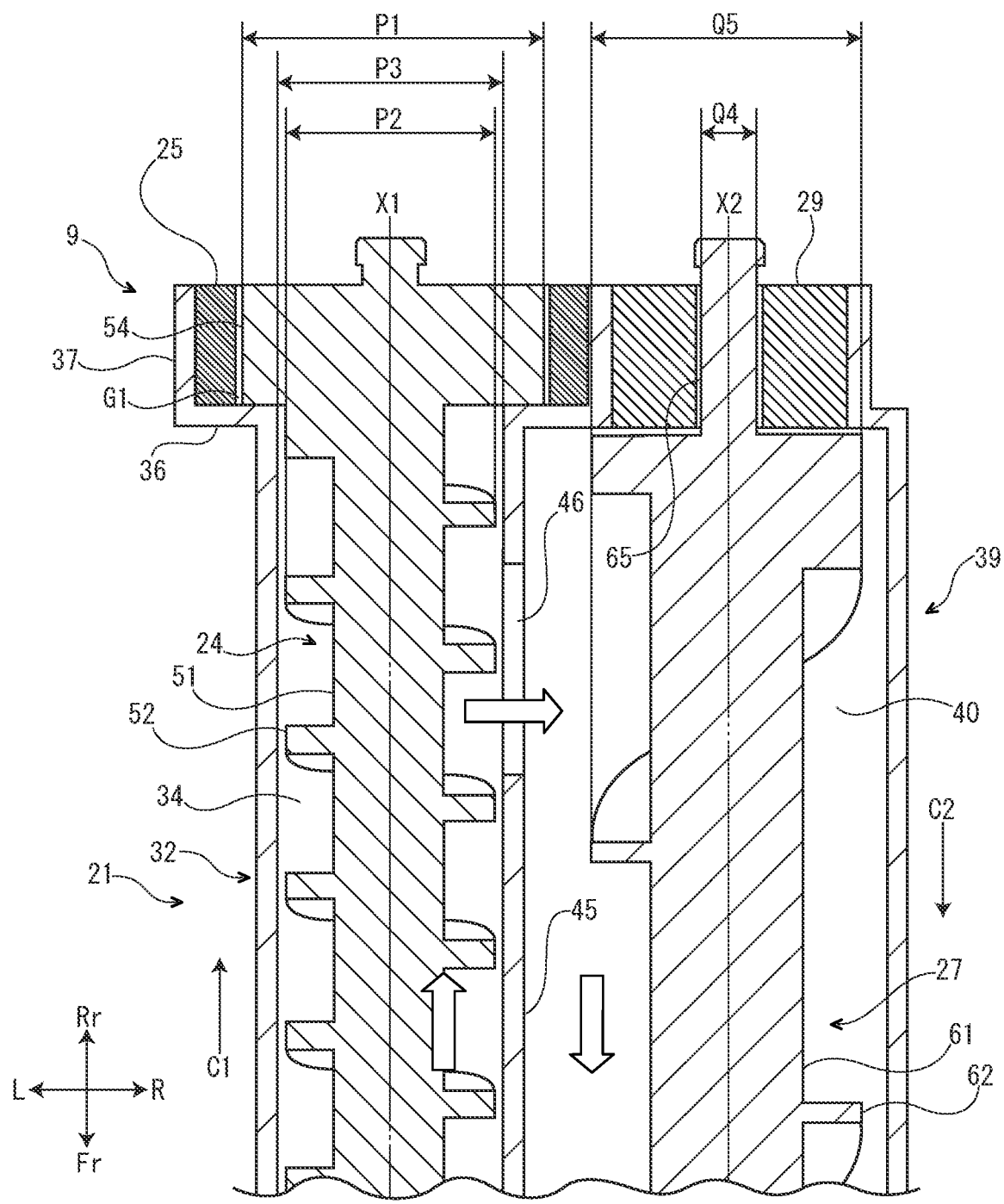
FIG. 4 is a sectional view showing the rear end portion of the development device, viewed from the upper side, according to the embodiment of the present invention.

With reference to FIG. 4, in the rear end portion (the downstream side end portion in the first conveyance direction C1) of the first duct 32 of the casing 21, an annular first flange 36 is protruded radially outward. In the radially outer end portion of the first flange 36, a cylindrical first holder 37 is protruded rearward (to the downstream side in the first conveyance direction C1).

With reference to FIG. 2 and FIG. 3, in the right lower portion of the casing 21, a U-shaped second duct 39 whose upper face is opened is provided. The second duct 39 extends along the second conveyance direction C2. In the second duct 39, a second toner conveyance path 40 is formed.

Figure 5:
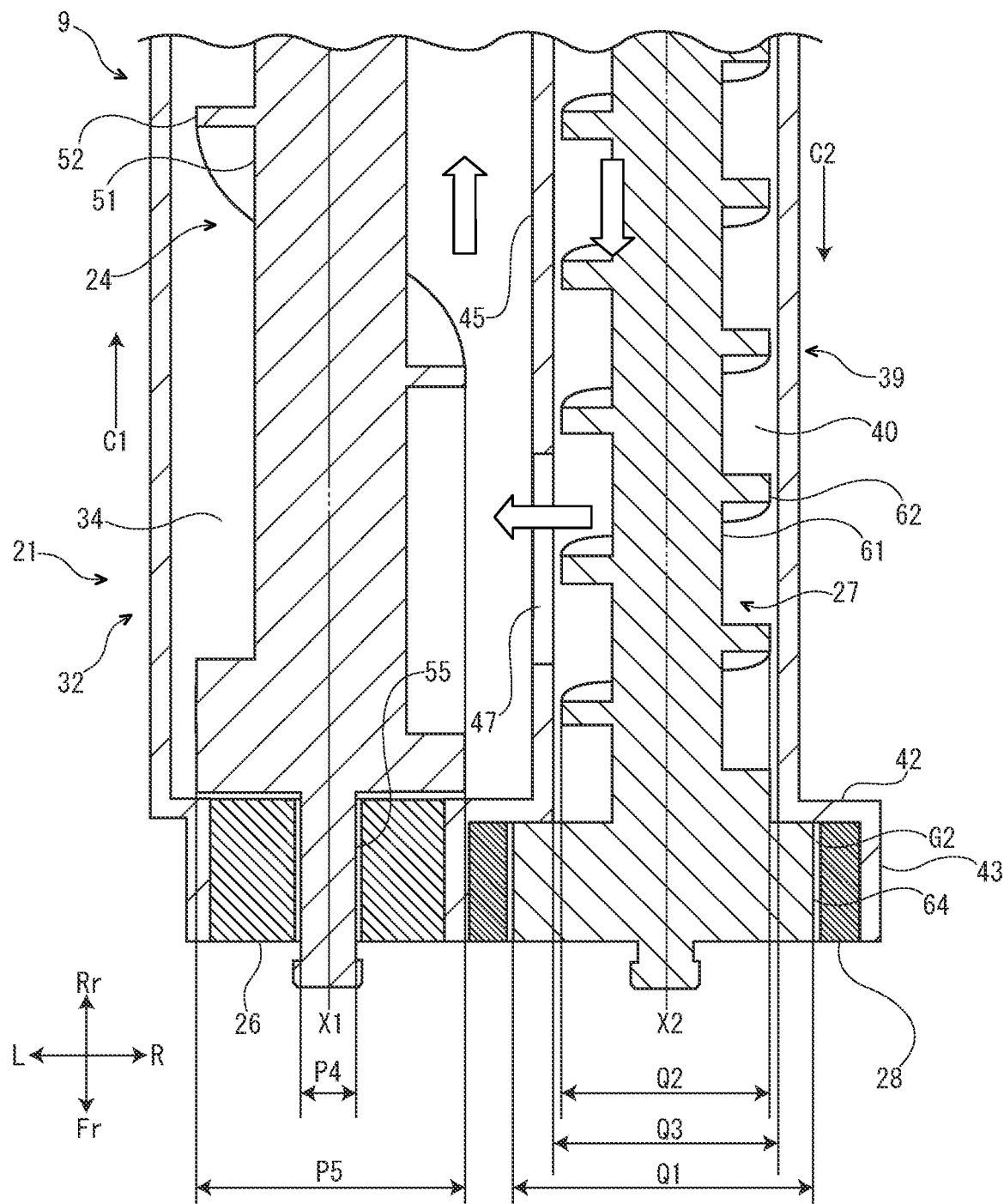
FIG. 5 is a sectional view showing the front end portion of the development device, viewed from the upper side, according to the embodiment of the present invention.

With reference to FIG. 5, in the front end portion (the downstream side end portion in the second conveyance direction C2) of the second duct 39 of the casing 21, an annular second flange 42 is protruded radially outward. In the radially outer end portion of the second flange 42, a cylindrical second holder 43 is protruded forward (to the downstream side in the second conveyance direction C2).

With reference to FIG. 2 and FIG. 3, in the lower center portion in the casing 21, a partition wall 45 is provided. The partition wall 45 is also used as a right side wall of the first duct 32 and a left side wall of the second duct 39. The partition wall 45 divides the first toner conveyance path 34 from the second toner conveyance path 40. In the rear end portion of the partition wall 45, a first communication port 46 is formed, and in the front end portion of the partition wall 45, a second communication port 47 is provided.

With reference to FIG. 2, the development roller 22 of the development device 9 has a cylindrical shape. The development roller 22 is exposed to the outside of the casing 21 through the opening 31 of the casing 21, and faces the photosensitive drum 8. The development roller 22 is rotatably supported by the casing 21. Inside the development roller 22, a plurality of magnetic poles 49 is stored.

With reference to FIG. 2, the regulating blade 23 of the development device 9 is fixed to the right lower portion of the casing 21. The regulating blade 23 faces the development roller 22 via a predetermined gap.

With reference to FIG. 2 and FIG. 3, the first screw 24 of the development device 9 is stored in the first toner conveyance path 34. The first screw 24 is provided so as to be rotatable around a first rotational axis X1 extending along the front-and-rear direction.

The first screw 24 has a first shaft 51 extending in the first conveyance direction C1 and a spiral first fin 52 protruded around the outer circumferential face of the first shaft 51.

With reference to FIG. 4, in the rear end portion (the downstream side end portion in the first conveyance direction C1) of the first shaft 51 of the first screw 24, a columnar first downstream side insertion part 54 is provided on the rear side (the downstream side in the first conveyance direction C1) of the first fin 52. The first downstream side insertion part 54 has an outer diameter P1 larger than an outer diameter P2 of the rear end portion (the downstream side end portion in the first conveyance direction C1) of the first fin 52. The outer diameter P1 of the first downstream side insertion part 54 is larger than an inner diameter P3 of the rear end portion (the downstream side end portion in the first conveyance direction C1) of the first toner conveyance path 34.

With reference to FIG. 5, in the front end portion (the upstream side end portion in the first conveyance direction C1) of the first shaft 51 of the first screw 24, a columnar first upstream side insertion part 55 is provided on the front side (the upstream side in the first conveyance direction C1) of the first fin 52. The first upstream side insertion part 55 has an outer diameter P4 smaller than an outer diameter P5 of the front end portion (the upstream side end portion in the first conveyance direction C1) of the first fin 52.

With reference to FIG. 3 to FIG. 5, the first fin 52 of the first screw 24 is continuously formed from the front end portion to the rear end portion of the first shaft 51. The outer diameter P2 (refer to FIG. 4) of the rear end portion (the downstream side end portion in the first conveyance direction C1) of the first fin 52 is smaller than the outer diameter P5 (refer to FIG. 5) of the front end portion (the upstream side end portion in the first conveyance direction C1) of the first fin 52.

With reference to FIG. 4, the first downstream side bearing 25 of the development device 9 is a sliding bearing, for example, and has an annular shape. The first downstream side bearing 25 is fitted in the first holder 37 of the first duct 32 of the casing 21 to be supported by the first holder 37. Into the first downstream side bearing 25, the first downstream side insertion part 54 of the first shaft 51 of the first screw 24 is inserted. A gap G1 between the first downstream side insertion part 54 and the first downstream side bearing 25 is covered with the first flange 36 of the first duct 32 of the casing 21 from the front side (the upstream side in the first conveyance direction C1).

With reference to FIG. 5, the first upstream side bearing 26 of the development device 9 is a sliding bearing, for example, and has an annular shape. Into the first upstream side bearing 26, the first upstream side insertion part 55 of the first shaft 51 of the first screw 24 is inserted.

With reference to FIG. 2 and FIG. 3, the second screw 27 of the development device 9 is stored in the second toner conveyance path 40. The second screw 27 is provided so as to be rotatable around a second rotational axis X2 extending along the front-and-rear direction.

The second screw 27 has a second shaft 61 extending along the second conveyance direction C2 and a spiral second fin 62 protruded around the outer circumferential face of the second shaft 61.

With reference to FIG. 5, in the front end portion (the downstream side end portion in the second conveyance direction C2) of the second shaft 61 of the second screw 27, a columnar second downstream side insertion part 64 is provided on the front side (the downstream side in the second conveyance direction C2) of the second fin 62. The second downstream side insertion part 64 has an outer diameter Q1 larger than an outer diameter Q2 of the front end portion (the downstream side end portion in the second conveyance direction C2) of the second fin 62. The outer diameter Q1 of the second downstream side insertion part 64 is larger than an inner diameter Q3 of the front end portion (the downstream side end portion in the second conveyance direction C2) of the second toner conveyance path 40.

With reference to FIG. 4, in the rear end portion (the upstream side end portion in the second conveyance direction C2) of the second shaft 61 of the second screw 27, a columnar second upstream side insertion part 65 is provided on the rear side (the upstream side in the second conveyance direction C2) of the second fin 62. The second upstream side insertion part 65 has an outer diameter Q4 smaller than an outer diameter Q5 of the rear end portion (the upstream side end portion in the second conveyance direction C2) of the second fin 62.

With reference to FIG. 3 to FIG. 5, the second fin 62 of the second screw 27 is continuously formed from the front end portion to the rear end portion of the second shaft 61. The outer diameter Q2 (refer to FIG. 5) of the front end portion (the downstream side end portion in the second conveyance direction C2) is smaller than the outer diameter Q5 (refer to FIG. 4) of the rear end portion (the upstream side end portion in the second conveyance direction C2) of the second fin 62.

With reference to FIG. 5, the second downstream side bearing 28 of the development device 9 is a sliding bearing, for example, and has an annular shape. The second downstream side bearing 28 is fitted in the second holder 43 of the second duct 39 of the casing 21 to be supported by the second holder 43. Into the second downstream side bearing 28, the second downstream side insertion part 64 of the second shaft 61 of the second screw 27 is inserted. A gap G2 between the second downstream side insertion part 64 and the second downstream side bearing 28 is covered with the second flange 42 of the second duct 42 of the casing 21 from the rear side (the upstream side in the second conveyance direction C2). A position of the second downstream side bearing 28 is overlapped with a position of the first downstream side bearing 26 in the front-and-rear direction.

With reference to FIG. 4, the second upstream side bearing 29 of the development device 9 is a sliding bearing, for example, and has an annular shape. Into the second upstream side bearing 29, the second upstream side insertion part 65 of the second shaft 61 of the second screw 27 is inserted. A position of the second upstream side bearing 29 is overlapped with a position of the first downstream side bearing 25 in the front-and-rear direction.

Next, an operation for developing the electrostatic latent image on the photosensitive drum 8 by the development device 9 (hereinafter, called "a development operation") will be described. The blank arrows shown in FIG. 3 to FIG. 5 indicate a flowing direction of the toner when the development operation is carried out.

At a time of carrying out the development operation, a motor (not shown) rotates the first screw 24 and the second screw 27 (see the dotted line arrow in FIG. 2). Thus, the toner in the first toner conveyance path 34 is conveyed by the first screw 24 in the first conveyance direction C1, and flows from the rear end of the first toner conveyance path 34 through the first communication port 46 to the rear end portion of the second toner conveyance path 40. The toner flowing into the rear end portion of the second toner conveyance path 40 in the above manner is conveyed by the second screw 27 in the second conveying direction C2, and flows from the front end portion of the second toner conveyance path 40 through the second communication port 47 to the front end portion of the first toner conveying path 34. The toner flowing into the front end portion of the first toner conveyance path 34 in the above manner is conveyed again by the first screw 24 in the first conveyance direction C1.

By circulating the toner by the first screw 24 and the second screw 27 in the above manner, the toner is agitated and charged. The charged toner is attracted by a magnetic force of the magnetic poles 49 stored in the development roller and carried on the development roller 22.

Further, at the time of carrying out the development operation, the motor (not shown) rotates the development roller 22 (refer to the dotted line arrow in FIG. 2). Then, the toner carried on the development roller 22 is moved to a facing area between the development roller 22 and the regulating blade 23, and the thickness of the toner carried on the development roller 22 is regulated by the regulating blade 23. After the thickness of the toner carried on the development roller 22 is regulated, the toner is moved to a facing area between the development roller 22 and the photosensitive drum 8. Then, the toner is attracted to the electrostatic latent image on the photosensitive drum 8, and the electrostatic latent image on the photosensitive drum 8 is developed.

Hereinafter, a technical effect of the development device 9 according to the present embodiment will be described. Regarding the common technical effect of the first screw 24 and the second screw 27, only the technical effect of the first screw 24 will be described, and regarding the common technical effect of the first dust 32 and the second duct 39, only the technical effect of the first duct 32 will be described.

In this embodiment, the outer diameter P1 of the first downstream side insertion part 54 is larger than the outer diameter P2 of the rear end portion (the downstream side end portion in the first conveyance direction C1) of the first fin 52. By adopting such a configuration, it becomes possible to shift the gap G1 between the first downstream side insertion part 54 and the first downstream side bearing 25 radially outward from the rear end portion of the first fin 52. Thus, when the toner in the first toner conveyance path 34 is conveyed in the first conveyance direction C1 by the first screw 24, it becomes possible to prevent the toner from being pressed against the gap G1 with a large force. Therefore, the leakage of the toner to the outside of the development device 9 through the gap G1 can be suppressed.

Further, the casing 21 includes the cylindrical first duct 32 extending along the first conveyance direction C1, and the first toner conveyance path 34 is provided in the first duct 32. By adopting such a configuration, it becomes possible to convey the toner in the first toner conveyance path 34 efficiently along the first conveyance direction C1.

Further, in the rear end portion (the downstream side end portion in the first conveyance direction C1) of the first duct 32, the first flange 36 is protruded radially outward, and the first flange 36 covers the gap G1 from the front side (the upstream side in the first conveyance direction C1). By adopting such a configuration, the leakage of the toner to the outside of the development device 9 through the gap G1 can be suppressed more efficiently.

Further, in the radially outer end portion of the first flange 36, the first holder 37 is protruded rearward (to the downstream side in the first conveyance direction C1), and the first downstream side bearing 25 is held by the first holder 37. By adopting such a configuration, it becomes possible to hold the first downstream side bearing 25 by using a simple structure.

Further, the outer diameter P1 of the first downstream side insertion part 54 is larger than the inner diameter P3 of the rear end portion (the downstream side end portion in the first conveyance direction C1) of the first toner conveyance path 34. By adopting such a configuration, the leakage of the toner to the outside of the development device 9 can be suppressed more effectively.

Further, the outer diameter P4 of the first upstream side insertion part 55 is smaller than the outer diameter P5 of the front end portion (the upstream side end portion in the first conveyance direction C1) of the first fin 52. By adopting such a configuration, it becomes possible to decrease the outer diameter of the first upstream side bearing 26 into which the first upstream side insertion part 55 is inserted, as small as possible, and to suppress the first upstream side bearing 26 from interfering with other members.

Because the first upstream side insertion part 55 and the first upstream side bearing 26 are disposed on the front side (the upstream side in the first conveyance direction C1) of the first fin 52, the toner is hardly pressed against the gap between the first upstream side insertion part 55 and the first upstream side bearing 26 in the first place. Therefore, even if the outer diameter P4 of the first upstream side insertion part 55 is made to be smaller than the outer diameter P5 of the front end portion of the first fin 52 as described above, the toner hardly leaks to the outside of the development device 9.

Further, the image forming apparatus 1 includes the development device 9 as described above. By adopting such a configuration, it becomes possible to provide the image forming apparatus capable of suppressing the leakage of the toner to the outside of the development device 9.

Hereinafter, a modified example of the development device 9 according to the embodiment will be described. Regarding the common modified example of the first screw 24 and the second screw 27, only the modified example of the first screw 24 will be described, and regarding the common modified example of the first duct 32 and the second duct 39, only the modified example of the first duct 32 will be described.

Figure 6:
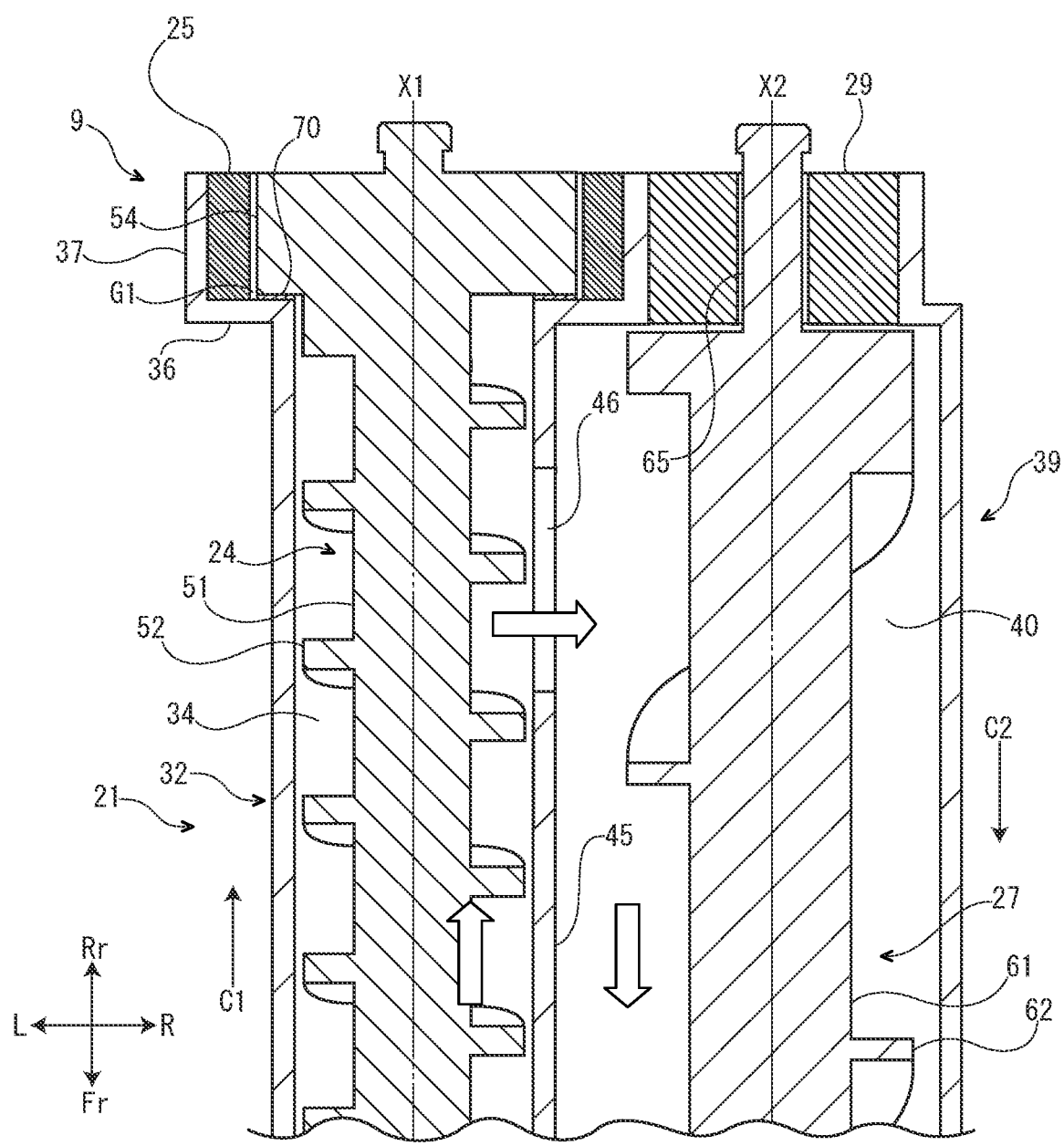
FIG. 6 is a sectional view showing the rear end portion of the development device, viewed from the upper side, according to another embodiment of the present invention.

In the present embodiment, as shown in FIG. 4, the first flange 36 comes into contact with the first downstream side insertion part 54. On the other hand, in another different embodiment, as shown in FIG. 6, a film-like seal member 70 is disposed between the first flange 36 and the first downstream side insertion part 54. By adopting such a configuration, it becomes possible to rotate the first screw 24 smoothly and to suppress the toner leakage to the outside of the development device 9 through the gap G1 more efficiently.

In the present embodiment, the outer diameter P4 of the first upstream side insertion part 55 is smaller than the outer diameter P5 of the front end portion (the upstream side end portion in the first conveyance direction C1) of the first fin 52. On the other hand, in another different embodiment, the outer diameter P4 of the first upstream side insertion part 55 may be larger than the outer diameter P5 of the front end portion (the upstream side end portion in the first conveyance direction C1) of the first fin 52.

In this embodiment, the development device 9 is an example of a toner conveyance device. On the other hand, in other different embodiments, the toner container 5 may be an example of a toner conveyance device, and a device (not shown) for conveying the toner from the toner container 5 to the development device 9 may be an example of a toner conveyance device. In still another different embodiment, a device (not shown) for conveying the waste toner collected from the intermediate transferring belt 6 and the photosensitive drum 8 may be an example of the toner conveyance device. That is, a device provided in any portion of the image forming apparatus 1 may be an example of a toner conveyance device.

In the present embodiment, the image forming apparatus 1 is a multifunctional peripheral. On the other hand, in another embodiment, the image forming apparatus 1 may be a printer, a copying machine, and a facsimile.

The invention claimed is:

1. A toner conveyance device comprising:
a casing having a cylindrical duct extending in a predetermined conveyance direction, and provided with a toner conveyance path in the duct;
a screw conveying a toner in the toner conveyance path in a predetermined conveyance direction; and
a downstream side bearing rotatably supporting a downstream side end portion of the screw in the conveyance direction, wherein
the screw includes:
a shaft extending in the conveyance direction; and
a spiral fin provided around an outer circumferential face of the shaft,
the shaft has a downstream side insertion part inserted into the downstream side bearing,
the downstream side insertion part has an outer diameter larger than an outer diameter of a downstream side end portion of the fin in the conveyance direction,
the duct has a flange protruded radially outward on a downstream side end portion of the duct in the conveyance direction, and
the flange covers a gap between the downstream side insertion part and the downstream side bearing from an upstream side in the conveyance direction.

2. The toner conveyance device according to claim 1, wherein
the gap between the downstream side insertion part and the downstream side bearing is disposed radially outward from the downstream side end portion of the fin.

3. The toner conveyance device according to claim 1, wherein
a film-shaped seal member is disposed between the flange and the downstream side insertion part.

4. The toner conveyance device according to claim 1, wherein
a holder is protruded toward a downstream side in the conveyance direction on a radially outer end portion of the flange, and
the downstream side bearing is held by the holder.

5. The toner conveyance device according to claim 1, wherein
the outer diameter of the downstream side insertion part is larger than an inner diameter of a downstream side end portion of the toner conveyance path in the conveyance direction.

6. The toner conveyance device according to claim 1, further comprising an upstream side bearing rotatably supporting an upstream side end portion of the screw in the conveyance direction, wherein
the shaft further has an upstream side insertion part inserted into the upstream side bearing, and
the upstream side insertion part has an outer diameter smaller than an outer diameter of an upstream side end portion of the fin in the conveyance direction.

7. The toner conveyance device according to claim 1, wherein
the duct has a toner communication port on a downstream side in the conveyance direction.

8. An image forming apparatus including the toner conveyance device according to claim 1.

* * * * *